United States Patent
Kutch et al.

(10) Patent No.: US 10,554,513 B2
(45) Date of Patent: Feb. 4, 2020

(54) TECHNOLOGIES FOR FILTERING NETWORK PACKETS ON INGRESS

(71) Applicant: Intel Corporation, Santa Clara, CA (US)

(72) Inventors: Patrick Kutch, Beaverton, OR (US); Andrey Chilikin, Limerick (IE); Mark Gray, Santa Clara, CA (US); Sugesh Chandran, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/024,772

(22) Filed: Jun. 30, 2018

(65) Prior Publication Data

US 2019/0044835 A1 Feb. 7, 2019

(51) Int. Cl.
- *H04L 12/26* (2006.01)
- *H04L 12/931* (2013.01)
- *H04L 29/06* (2006.01)
- *H04L 12/851* (2013.01)

(52) U.S. Cl.
CPC ........ *H04L 43/028* (2013.01); *H04L 47/2441* (2013.01); *H04L 49/70* (2013.01); *H04L 69/22* (2013.01)

(58) Field of Classification Search
CPC . H04J 3/14; H04L 1/243; H04L 43/50; H04L 47/10; H04L 2012/5631; H04L 47/15; H04L 47/2441; H04L 47/70; H04L 47/30; H04L 47/11; H04L 47/12; H04L 47/35; H04L 47/32; H04L 43/0852; H04L 43/08; H04B 17/0012; H04B 17/028; H04B 17/003; H04W 40/02; H04W 40/24; H04W 40/34; H04W 24/00
USPC ............... 370/349, 230, 229, 235, 238, 252, 370/395.21, 395.43, 395.5
See application file for complete search history.

(56) References Cited

U.S. PATENT DOCUMENTS 5,995,971 A * 11/1999 Douceur ............. G06F 16/9027
6,570,884 B1 * 5/2003 Connery ............... H04L 45/745
370/392

* cited by examiner

*Primary Examiner* — Brenda H Pham
(74) *Attorney, Agent, or Firm* — Barnes & Thornburg LLP

(57) ABSTRACT

Technologies for filtering network packets on ingress include a network interface controller (NIC) to retrieve classification filters based on packet classification identifying information of a network packet received by the NIC, wherein each of the classification filters is usable to identify rules for identifying any operations to be performed on at least a portion of the received network packet. The NIC is further configured to compare the first classification filter to the packet classification identifying information to determine whether the determined packet classification identifying information meets criteria of the first classification filter. Additionally, the NIC is configured to associate a classification filter identifier of the first classification filter with the received network packet and send the received network packet and the classification filter identifier of the first classification filter to a processor of an apparatus associated with the NIC. Other embodiments are described herein.

25 Claims, 4 Drawing Sheets

TECHNOLOGIES FOR FILTERING NETWORK PACKETS ON INGRESS

BACKGROUND

Modern computing devices have become ubiquitous tools for personal, business, and social uses. As such, many modern computing devices are capable of connecting to various data networks, including the Internet, to transmit and receive data communications over the various data networks at varying rates of speed. To facilitate communications between computing devices, the data networks typically include one or more network computing devices (e.g., compute servers, storage servers, etc.) to route communications (e.g., via switches, routers, etc.) that enter/exit a network (e.g., north-south network traffic) and between network computing devices in the network (e.g., east-west network traffic). In present packet-switched network architectures, data is transmitted in the form of network packets between networked computing devices. At a high level, data is packetized into a network packet at one computing device and the resulting packet transmitted, via a transmission device (e.g., a network interface controller (NIC) of the computing device), to another computing device over a network.

Upon receipt of a network packet, the computing device typically performs some level of examination on at least a portion of the received network packet to determine what, if any, operations (e.g., drop the network packet, process/store at least a portion of the network packet, forward the network packet, etc.) are to be performed by the computing device. In some embodiments, the rules for determining which operation(s) are to be performed can be relatively simple, such as Layer-2 switching based on readily identifiable header information (e.g., a destination media access controller (MAC) address, a virtual local area network (VLAN) tag, etc.), or more complex based upon Layer-3 routing, or an even deeper network packet inspection. However, the more complex the filtering/inspection process, coupled with higher connection rates, the more processing (e.g., central processing unit (CPU)) cores are typically required to process/inspect the received network packets. The excessive usage of the additional processor cores can be costly for users leveraging cloud services that charge the user for use of their CPU cores. Such excessive CPU core usage can also prove costly for cloud providers for which such operations are being performed internally and are not charged back to the user, as those used cores could otherwise be rented or sold during that period of time.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
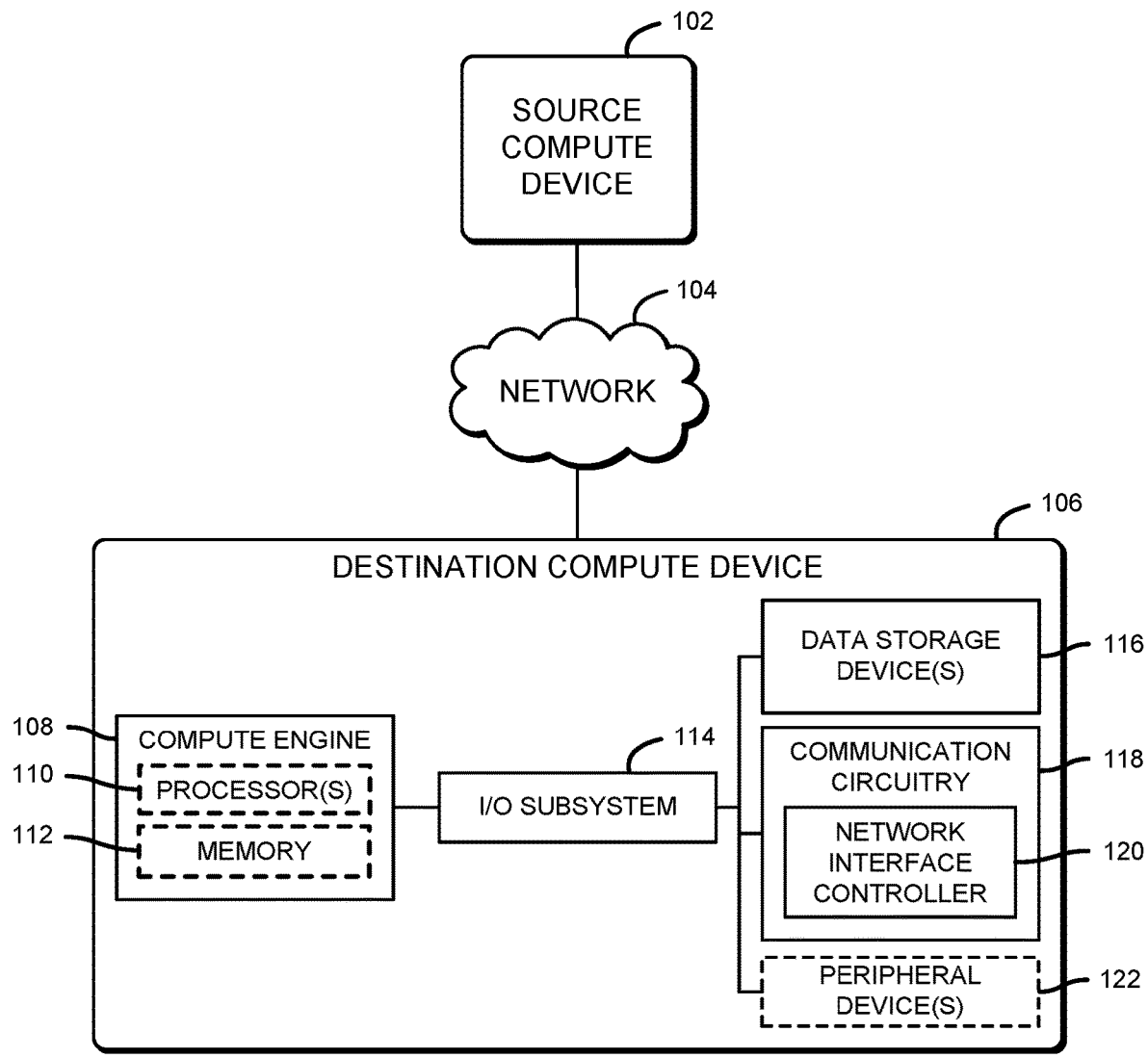
FIG. 1 is a simplified block diagram of at least one embodiment of a system for filtering network packets on ingress that includes a source compute device and a destination compute device communicatively coupled via a network.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one of A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, in an illustrative embodiment, a system 100 for filtering network packets on ingress includes a source compute device 102 communicatively coupled to a destination compute device 106 via a network 104. While illustratively shown as having a single source compute device 102 and a single destination compute device 106, the system 100 may include multiple source compute devices 102 and multiple destination compute devices 106, in other embodiments. It should be appreciated that the source compute device 102 and destination compute device 106 have been illustratively designated herein as being one of a "source" and a "destination" for the purposes of providing clarity to the description and that the source compute device 102 and/or the destination compute device 106 may be capable of performing any of the functions described herein. It should be further appreciated that the source compute device 102 and the destination compute device 106 may reside in the same data center or high-performance computing (HPC) environment. In other words, the source compute device 102 and destination compute device 106 may reside in the same network 104 connected via one or more wired interconnects.

In use, the source compute device 102 and the destination compute device 106 transmit and receive network traffic (e.g., network packets, frames, etc.) to/from each other. For example, the destination compute device 106 may receive a network packet from the source compute device 102. Upon receipt of a network packet, the destination compute device 106, or more particularly a network interface controller (NIC) 120 of the destination compute device 106, identifies how to process the network packet. To do so, as will be described in further detail below, the NIC 120 compares at least a portion of, or a characteristic of, the network packet to a set of classification filters. A classification filter may include any type of data that is usable to identify whether a received network packet meets one or more predetermined criteria.

Upon having detected that the received packet meets one or more predetermined criteria of a classification filter (i.e., as a result of the comparison between the classification filter and data/characteristic of a received network packet), the NIC 120 then associates the received network packet with an identifier corresponding to that classification filter. The classification filter identifiers are usable by a receiving component (e.g., a host operating system, a guest operating system, a hypervisor, a virtual switch, etc.) to identify rules for determining which one or more operations are to be performed on at least a portion of the received network packet.

After exhausting the set of classification filters, the NIC 120 sends the received network packet, along with any classification filter identifiers associated with any classification filters for which the respective criteria was met, to an operating system (e.g., a host operating system or a guest operating system) presently executing on the destination compute device 106. Upon receipt of the network packet and any classification filter identifiers, the operating system may then determine what operations to perform based on the received classification filter identifiers, if available; otherwise, the receiving operating system can perform standard network packet processing operations without the aid of any classification filter identifiers.

The destination compute device 106 may be embodied as any type of computation or computer device capable of performing the functions described herein, including, without limitation, a computer, a server (e.g., stand-alone, rack-mounted, blade, etc.), a sled (e.g., a compute sled, an accelerator sled, a storage sled, a memory sled, etc.), an enhanced or smart NIC (e.g., a host fabric interface (HFI)), a network appliance (e.g., physical or virtual), a router, switch (e.g., a disaggregated switch, a rack-mounted switch, a standalone switch, a fully managed switch, a partially managed switch, a full-duplex switch, and/or a half-duplex communication mode enabled switch), a web appliance, a distributed computing system, a processor-based system, and/or a multiprocessor system.

As shown in FIG. 1, the illustrative destination compute device 106 includes a compute engine 108, an I/O subsystem 114, one or more data storage devices 116, communication circuitry 118, and, in some embodiments, one or more peripheral devices 122. It should be appreciated that the destination compute device 106 may include other or additional components, such as those commonly found in a typical computing device (e.g., various input/output devices and/or other components), in other embodiments. Additionally, in some embodiments, one or more of the illustrative components may be incorporated in, or otherwise form a portion of, another component.

The compute engine 108 may be embodied as any type of device or collection of devices capable of performing the various compute functions as described herein. In some embodiments, the compute engine 108 may be embodied as a single device such as an integrated circuit, an embedded system, a field-programmable-array (FPGA), a system-on-a-chip (SOC), an application specific integrated circuit (ASIC), reconfigurable hardware or hardware circuitry, or other specialized hardware to facilitate performance of the functions described herein. Additionally, in some embodiments, the compute engine 108 may include, or may be embodied as, one or more processors 110 (i.e., one or more central processing units (CPUs)) and memory 112.

The processor(s) 110 may be embodied as any type of processor(s) capable of performing the functions described herein. For example, the processor(s) 110 may be embodied as one or more single-core processors, multi-core processors, digital signal processors (DSPs), microcontrollers, or other processor(s) or processing/controlling circuit(s). In some embodiments, the processor(s) 110 may be embodied as, include, or otherwise be coupled to an FPGA (e.g., reconfigurable circuitry), an ASIC, reconfigurable hardware or hardware circuitry, or other specialized hardware to facilitate performance of the functions described herein.

The memory 112 may be embodied as any type of volatile or non-volatile memory or data storage capable of performing the functions described herein. It should be appreciated that the memory 112 may include main memory (i.e., a primary memory) and/or cache memory (i.e., memory that can be accessed more quickly than the main memory). Volatile memory may be a storage medium that requires power to maintain the state of data stored by the medium. Non-limiting examples of volatile memory may include various types of random access memory (RAM), such as dynamic random access memory (DRAM) or static random access memory (SRAM).

The compute engine 108 is communicatively coupled to other components of the destination compute device 106 via the I/O subsystem 114, which may be embodied as circuitry and/or components to facilitate input/output operations with the processor 110, the memory 112, and other components of the destination compute device 106. For example, the I/O subsystem 114 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some embodiments, the I/O subsystem 114 may form a portion of a SoC and be incorporated, along with one or more of the processor 110, the memory 112, and other components of the destination compute device 106, on a single integrated circuit chip.

The one or more data storage devices 116 may be embodied as any type of storage device(s) configured for short-term or long-term storage of data, such as, for example, memory devices and circuits, memory cards, hard disk drives, solid-state drives, or other data storage devices. Each data storage device 116 may include a system partition that stores data and firmware code for the data storage device 116. Each data storage device 116 may also include an operating system partition that stores data files and executables for an operating system.

The communication circuitry 118 may be embodied as any communication circuit, device, or collection thereof, capable of enabling communications between the destination compute device 106 and other computing devices, such as the source compute device 102, as well as any network communication enabling devices, such as an access point, network switch/router, etc., to allow communication over the network 104. Accordingly, the communication circuitry 118 may be configured to use any one or more communication technologies (e.g., wireless or wired communication technologies) and associated protocols (e.g., Ethernet, Bluetooth®, Wi-Fi®, WiMAX, LTE, 5G, etc.) to effect such communication.

It should be appreciated that, in some embodiments, the communication circuitry 118 may include specialized circuitry, hardware, or combination thereof to perform pipeline logic (e.g., hardware algorithms) for performing the functions described herein, including comparing the network packet data/characteristic with the classification filters, processing network packets (e.g., parse received network packets, determine destination computing devices for each received network packets, forward the network packets to a particular buffer queue of a respective host buffer of the destination compute device 106, etc.), performing computational functions, etc.

In some embodiments, performance of one or more of the functions of communication circuitry 118 as described herein may be performed by specialized circuitry, hardware, or combination thereof of the communication circuitry 118, which may be embodied as a SoC or otherwise form a portion of a SoC of the destination compute device 106 (e.g., incorporated on a single integrated circuit chip along with a processor 110, the memory 112, and/or other components of the destination compute device 106). Alternatively, in some embodiments, the specialized circuitry, hardware, or combination thereof may be embodied as one or more discrete processing units of the destination compute device 106, each of which may be capable of performing one or more of the functions described herein.

The illustrative communication circuitry 118 includes the NIC 120, which may also be referred to as a host fabric interface (HFI) in some embodiments (e.g., high performance computing (HPC) environments), may be embodied as any type of firmware, hardware, software, or any combination thereof that facilities communications access between the destination compute device 106 and a network (e.g., the network 104). For example, the NIC 120 may be embodied as one or more add-in-boards, daughtercards, network interface cards, controller chips, chipsets, or other devices that may be used by the destination compute device 106 to connect with another compute device (e.g., the source compute device 102). In some embodiments, the NIC 120 may be embodied as part of a SoC that includes one or more processors, or included on a multichip package that also contains one or more processors. In some embodiments, the NIC 120 may include a local processor (not shown) and/or a local memory (not shown) that are both local to the NIC 120. In such embodiments, the local processor of the NIC 120 may be capable of performing one or more of the functions of a processor 110 described herein. Additionally or alternatively, in such embodiments, the local memory of the NIC 120 may be integrated into one or more components of the destination compute device 106 at the board level, socket level, chip level, and/or other levels.

The one or more peripheral devices 122 may include any type of device that is usable to input information into the destination compute device 106 and/or receive information from the destination compute device 106. The peripheral devices 122 may be embodied as any auxiliary device usable to input information into the destination compute device 106, such as a keyboard, a mouse, a microphone, a barcode reader, an image scanner, etc., or output information from the destination compute device 106, such as a display, a speaker, graphics circuitry, a printer, a projector, etc. It should be appreciated that, in some embodiments, one or more of the peripheral devices 122 may function as both an input device and an output device (e.g., a touchscreen display, a digitizer on top of a display screen, etc.). It should be further appreciated that the types of peripheral devices 122 connected to the destination compute device 106 may depend on, for example, the type and/or intended use of the destination compute device 106. Additionally or alternatively, in some embodiments, the peripheral devices 122 may include one or more ports, such as a USB port, for example, for connecting external peripheral devices to the destination compute device 106.

The source compute device 102 may be embodied as any type of computation or computer device capable of performing the functions described herein, including, without limitation, a smartphone, a mobile computing device, a tablet computer, a laptop computer, a notebook computer, a computer, a server (e.g., stand-alone, rack-mounted, blade, etc.), a sled (e.g., a compute sled, an accelerator sled, a storage sled, a memory sled, etc.), a network appliance (e.g., physical or virtual), a web appliance, a distributed computing system, a processor-based system, and/or a multiprocessor system. While not illustratively shown, it should be appreciated that source compute device 102 includes similar and/or like components to those of the illustrative destination compute device 106. As such, figures and descriptions of the like components are not repeated herein for clarity of the description with the understanding that the description of the corresponding components provided above in regard to the destination compute device 106 applies equally to the corresponding components of the source compute device 102. Of course, it should be appreciated that the computing devices may include additional and/or alternative components, depending on the embodiment.

The network 104 may be embodied as any type of wired or wireless communication network, including but not limited to a wireless local area network (WLAN), a wireless personal area network (WPAN), an edge network (e.g., a multi-access edge computing (MEC) network), a fog network, a cellular network (e.g., Global System for Mobile Communications (GSM), Long-Term Evolution (LTE), 5G, etc.), a telephony network, a digital subscriber line (DSL) network, a cable network, a local area network (LAN), a wide area network (WAN), a global network (e.g., the Internet), or any combination thereof. It should be appreciated that, in such embodiments, the network 104 may serve as a centralized network and, in some embodiments, may be communicatively coupled to another network (e.g., the Internet). Accordingly, the network 104 may include a variety of other virtual and/or physical network computing devices (e.g., routers, switches, network hubs, servers, storage devices, compute devices, etc.), as needed to facilitate communication between the destination compute device 106 and the source compute device 102, which are not shown to preserve clarity of the description.

Figure 2:
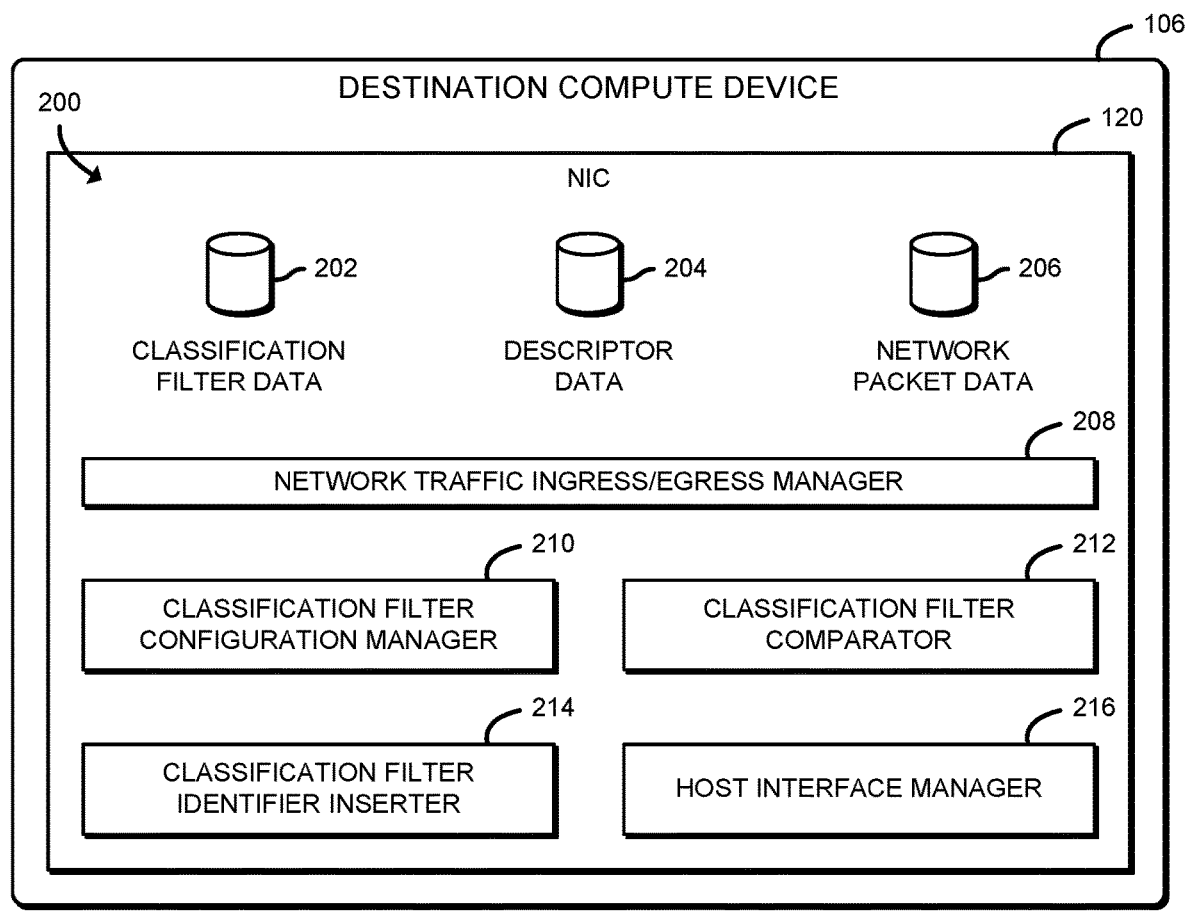
FIG. 2 is a simplified block diagram of at least one embodiment of an environment of the destination compute device of the system of FIG. 1.

Referring now to FIG. 2, in use, the destination compute device 106 establishes an environment 200 during operation. The illustrative environment 200 includes a network traffic ingress/egress manager 208, a classification filter configuration manager 210, a classification filter comparator 212, a classification filter identifier inserter 214, and a host interface manager 216. The various components of the environment 200 may be embodied as hardware, firmware, software, or a combination thereof. As such, in some embodiments, one or more of the components of the environment 200 may be embodied as circuitry or collection of electrical devices (e.g., network traffic ingress/egress management circuitry 208, classification filter configuration management circuitry 210, classification filter comparator circuitry 212, classification filter identifier insertion circuitry 214, host interface management circuitry 216, etc.).

As illustratively shown, the network traffic ingress/egress management circuitry 208, the classification filter configuration management circuitry 210, the classification filter comparator circuitry 212, the classification filter identifier insertion circuitry 214, and the host interface management circuitry 216 form a portion of the NIC 120. However, it should be appreciated that, in other embodiments, one or more functions described herein as being performed by the network traffic ingress/egress management circuitry 208, the classification filter configuration management circuitry 210, the classification filter comparator circuitry 212, the classification filter identifier insertion circuitry 214, and/or the host interface management circuitry 216 may be performed, at least in part, by one or more other components of the destination compute device 106, such as the compute engine 108, the I/O subsystem 114, the communication circuitry 118, and/or other components of the destination compute device 106.

Additionally, in some embodiments, one or more of the illustrative components may form a portion of another component and/or one or more of the illustrative components may be independent of one another. Further, in some embodiments, one or more of the components of the environment 200 may be embodied as virtualized hardware components or emulated architecture, which may be established and maintained by the NIC 120, the compute engine 108, or other components of the destination compute device 106. It should be appreciated that the destination compute device 106 may include other components, sub-components, modules, sub-modules, logic, sub-logic, and/or devices commonly found in a computing device, which are not illustrated in FIG. 2 for clarity of the description.

In the illustrative environment 200, the destination compute device 106 additionally includes classification filter data 202, descriptor data 204, and network packet data 206, each of which may be accessed by the various components and/or sub-components of the destination compute device 106. Further, each of the classification filter data 202, the descriptor data 204, and the network packet data 206 may be accessed by the various components of the destination compute device 106. Additionally, it should be appreciated that in some embodiments the data stored in, or otherwise represented by, each of the classification filter data 202, the descriptor data 204, and the network packet data 206 may not be mutually exclusive relative to each other. For example, in some implementations, data stored in the classification filter data 202 may also be stored as a portion of one or more of the descriptor data 204 and/or the network packet data 206, or in another alternative arrangement. As such, although the various data utilized by the destination compute device 106 is described herein as particular discrete data, such data may be combined, aggregated, and/or otherwise form portions of a single or multiple data sets, including duplicative copies, in other embodiments.

The network traffic ingress/egress manager 208, which may be embodied as hardware, firmware, software, virtualized hardware, emulated architecture, and/or a combination thereof as discussed above, is configured to receive inbound and route/transmit outbound network traffic. To do so, the illustrative network traffic ingress/egress manager 208 is configured to facilitate inbound network communications (e.g., network traffic, network packets, network flows, etc.) to the destination compute device 106. Accordingly, the network traffic ingress/egress manager 208 is configured to manage (e.g., create, modify, delete, etc.) connections to physical and virtual network ports (i.e., virtual network interfaces) of the destination compute device 106 (e.g., via the communication circuitry 118), as well as the ingress buffers/queues associated therewith.

Additionally, the network traffic ingress/egress manager 208 is configured to facilitate outbound network communications (e.g., network traffic, network packet streams, network flows, etc.) from the destination compute device 106. To do so, the network traffic ingress/egress manager 208 is configured to manage (e.g., create, modify, delete, etc.) connections to physical and virtual network ports/interfaces of the destination compute device 106 (e.g., via the communication circuitry 118), as well as the egress buffers/queues associated therewith. In some embodiments, at least a portion of the network packet (e.g., at least a portion of a header of the network packet, at least a portion of a payload of the network packet, a checksum, etc.) may be stored in the network packet data 206.

The classification filter configuration manager 210, which may be embodied as hardware, firmware, software, virtualized hardware, emulated architecture, and/or a combination thereof as discussed above, is configured to manage the configuration of the classification filters, as well as to generate and assign a unique identifier to each configured classification filter. To do so, the classification filter configuration manager 210 is configured to receive information that is usable to create a classification filter. As described previously, a classification filter may include any type of data that is usable to identify whether a received network packet meets one or more predetermined criteria. For example, the classification filter may include, but is not limited to, data and one or more masks, such as a series of source bytes and masks, specific offsets into a network packet and masks, etc., and/or a characteristic of a network packet, such as a source of the network packet, an intended destination for the network packet, an identifier of a flow/workload type of the network packet, whether the network packet is encrypted, an associated protocol associated with the network packet, etc.

The classification filter configuration manager 210 may be configured to receive information manually, such as via an administrator interface, or programmatically, such as via a protocol/network stack, a device driver, etc. In an illustrative embodiment, one or more functions described herein as being performed by the classification filter configuration manager 210 may be performed by a virtual switch communicatively coupled to multiple virtual machines (see, e.g., the virtual machines 402 and the virtual switch 404 of FIG.

4), each having their own guest operating system. In some embodiments, the configured classification filters may be stored in the classification filter data 202.

The classification filter comparator 212, which may be embodied as hardware, firmware, software, virtualized hardware, emulated architecture, and/or a combination thereof as discussed above, is configured to perform the classification filter comparisons to identify whether a received network packet meets the criteria associated with one or more of the previously configured classification filters. To do so, the classification filter comparator 212 is configured to determine packet classification identifying information of each received network packet. The packet classification identifying information may include any data included in at least a portion of a received network packet (e.g., a header field of the network packet, a portion of the payload of the network packet, etc.) and/or a characteristic of a received network packet (e.g., a protocol type associated with the network packet, a flow/workload type of the network packet, a source/destination of the network packet, whether at least a portion of the network packet if encrypted, etc.) that is usable to compare against one or more criterion of a classification filter to determine whether that network packet meets the requisite criteria of any of the classification filters.

Additionally, the classification filter comparator 212 is configured to retrieve one or more of the classification filters (e.g., as previously configured by the classification filter configuration manager 210). It should be appreciated that, depending on the embodiment, the classification filters themselves may be categorized or otherwise filtered such that not every classification filter is compared to each received network packet, but only those classification filter(s) of particular relevance as implemented by the classification filter comparator 212 and determinable by the categorization/filtering technique are used for a given received network packet. The classification filter comparator 212 is further configured to determine whether the network packet meets the requisite criteria associated with one or more of the classification filters.

To do so, for example, depending on the criteria associated with the respective classification filter being compared against, the classification filter comparator 212 may be configured to compare data that is expected to be present in a particular location in the network packet (e.g., in a header field, at an offset in the payload, etc., as identified in the classification filter), apply one or more predetermined bit masks (i.e., as identified in the classification filter) to a particular portion of the network packet, etc. Additionally or alternatively, in another example, again depending on the criteria associated with the respective classification filter being compared against, the classification filter comparator 212 may be configured to compare an expected characteristic of the network packet (i.e., as identified in the classification filter) with an actual characteristic of the network packet, such as whether the network packet is encrypted, a flow/workload type of the network packet, a source of the network packet, a destination of the network packet, a protocol associated with the network packet, etc.

The classification filter identifier inserter 214, which may be embodied as hardware, firmware, software, virtualized hardware, emulated architecture, and/or a combination thereof as discussed above, is configured to insert an identifier associated with a classification filter (i.e., a classification filter identifier) whose corresponding criteria have been determined to have been met (e.g., by the classification filter comparator 212). As described previously, the classification filter identifiers are usable by a receiving component (e.g., a host operating system, a guest operating system, a hypervisor, a virtual switch, etc.) to identify rules for determining which one or more operations are to be performed on at least a portion of the received network packet. To insert the classification filter identifiers, in some embodiments, the classification filter identifier inserter 214 may be configured to insert a classification filter identifier into a descriptor associated with the network packet. Additionally or alternatively, in some embodiments, the classification filter identifier inserter 214 may be configured to insert a classification filter identifier into a predetermined location in the network packet itself.

It should be appreciated that, under certain conditions, the network packet may match more than one classification filter. Accordingly, under such conditions, the classification filter identifier inserter 214 may be further configured to insert a list of the classification filters (e.g., a list of identifiers, a bit mask representing the list of identifiers, etc.) whose criteria has been met. Alternatively, under such conditions, the classification filter identifier inserter 214 may be further configured to insert the first classification filter whose criteria has been met, compare a priority level for each subsequent classification filter whose criteria has been met to determine which classification filter has a higher priority, and update the classification filter identifier such that the only classification filter identifier that remains inserted corresponds to the classification filter with the highest priority.

The host interface manager 216, which may be embodied as hardware, firmware, software, virtualized hardware, emulated architecture, and/or a combination thereof as discussed above, is configured to manage the passing of the network packets, or at least a portion thereof or message(s) relating thereto, and any identified classification filters to a respective host via a host interface (not shown) of the NIC 120. While not illustratively shown, it should be appreciated that the NIC 120 includes a host interface that facilitates communication between the NIC 120 and the host(s) (e.g., processor core(s), a VM hypervisor, etc.) of the destination computing device 106. Accordingly, each host interface is configured to function as an interface between a respective host and the NIC 120. It should be further appreciated that messages and/or network packet data may be passed therebetween via one or more communication links, such as PCIe interconnects, to provide access to the host (i.e., compute/storage resources), which are well understood and not shown to preserve clarity of the description.

Figure 3:
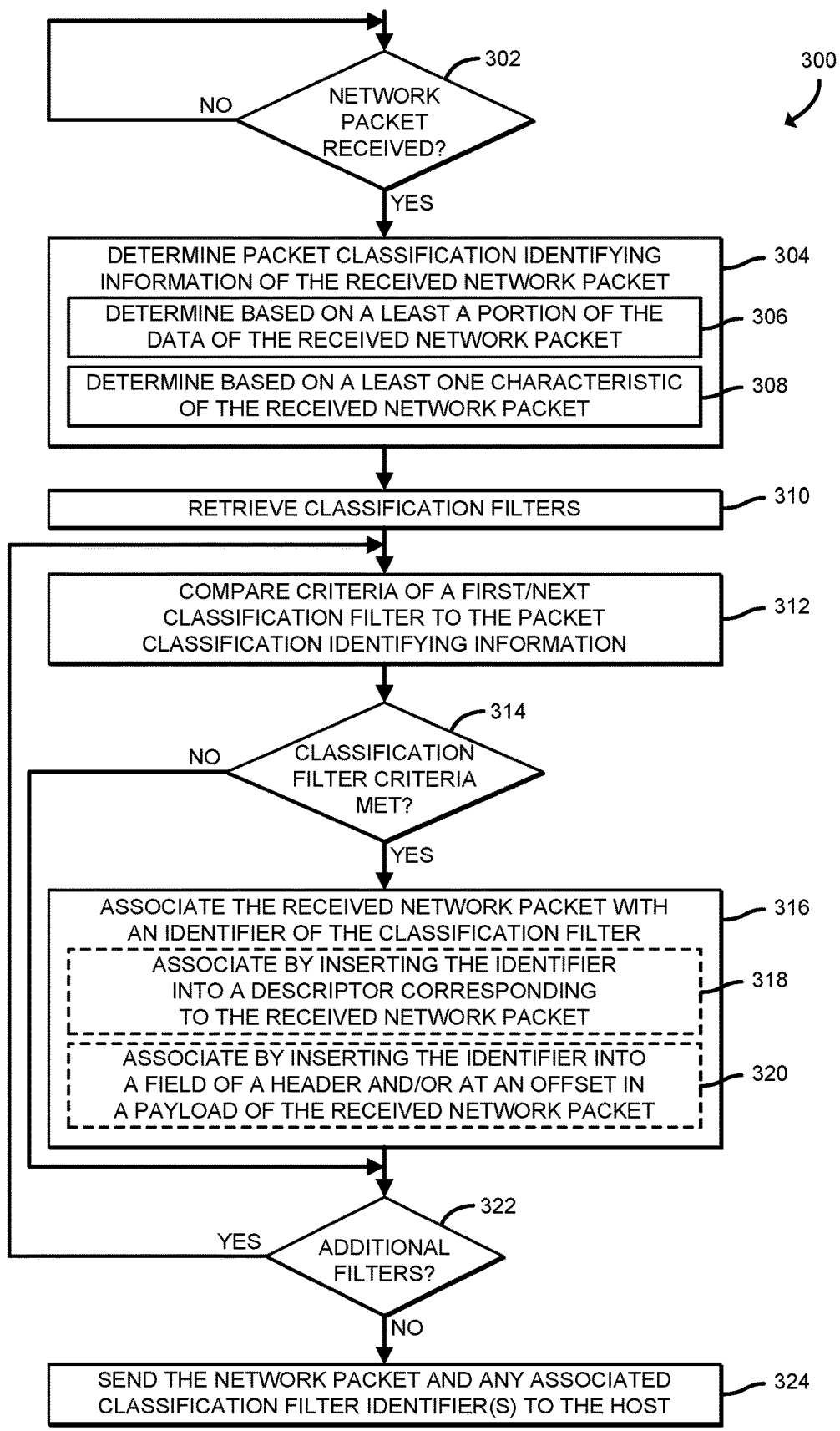
FIG. 3 is a simplified flow diagram of at least one embodiment of a method for filtering network packets on ingress that may be executed by the destination compute device of FIGS. 1 and 2.

Referring now to FIG. 3, a method 300 for filtering network packets on ingress is shown which may be executed by a compute device (e.g., the destination compute device 106 of FIGS. 1 and 2), or more particularly by a NIC of the compute device (e.g., the NIC 120 of FIG. 2). The method 300 begins with block 302, in which the NIC 120 determines whether a network packet has been received. If so, the method 300 advances to block 304, in which the NIC 120 determines packet classification identifying information of the received network packet.

As described previously, the packet classification identifying information may include any data included in at least a portion of a received network packet and/or a characteristic of a received network packet that is usable to compare against one or more criterion of a classification filter to determine whether that network packet meets the requisite criteria of any of the classification filters. Accordingly, in block 306, the NIC 120 determines the packet classification identifying information based on at least a portion of the data of the received network packet. Additionally or alternatively, in block 308, the NIC 120 determines the packet classification identifying information based on at least one characteristic of the received network packet.

In block 310, the NIC 120 retrieves the previously configured classification filters. As described previously, depending on the embodiment, the filters themselves may be categorized or otherwise filtered such that the NIC 120 may only retrieve a subset of the classification filters (e.g., based on the packet classification identifying information determined for the received network packet). In block 312, the NIC 120 compares the one or more criterion of a first retrieved classification filter to the determined packet classification identifying information. In block 314, the NIC 120 determines whether the one or more criterion of a first retrieved classification filter has been met (i.e., as a result of the comparison). If not, the method 300 jumps to block 322, which is described below; otherwise, the method 300 advances to block 316.

In block 316, the NIC 120 associates the received network packet with a classification filter identifier. As described previously, the classification filter identifiers are usable by a receiving component (e.g., a host operating system, a guest operating system, a hypervisor, a virtual switch, etc.) to identify rules for determining which one or more operations are to be performed on at least a portion of the received network packet. To associate the received network packet with a classification filter identifier, in block 318, the NIC 120 may associate the received network packet with the classification filter identifier by inserting the identifier into a descriptor corresponding to the received network packet. Alternatively, in block 320, the NIC 120 may associate the received network packet with the classification filter identifier by inserting the identifier into a field of a header of the received network packet and/or at an offset in a payload of the received network packet. It should be appreciated that, in some embodiments, alternative associations may be made. For example, in an alternative embodiment, a flag in the descriptor may be used to indicate whether or how many classifications filters have been identified as having criteria for which the determined packet classification identifying information of the received network packet has met. In such an alternative embodiment, the corresponding classification filter identifier(s) may be stored in a header or payload of the network packet.

As described previously, the determined packet classification identifying information of the received network packet may meet the criteria of one or more classification filters. Accordingly, as also described previously, under such conditions, the NIC 120 may be configured to replace a previously inserted classification filter identifier with the presently identified classification filter identifier (e.g., the previously inserted classification filter identifier has a lower priority than the presently identified classification filter identifier), ignore the presently identified classification filter identifier (e.g., the previously inserted classification filter identifier has a higher priority than the presently identified classification filter identifier), or add/append the presently identified classification filter identifier to a list of identified classification filter identifiers.

In block 322, the NIC 120 determines whether there are any additional classification filters for which the criteria thereof have not yet been compared to the determined packet classification identifying information of the received network packet. If so, the method 300 returns to block 312, in which the NIC 120 compares the one or more criterion of a next retrieved classification filter to the determined packet classification identifying information. Otherwise, if no additional classification filters remain to be checked, the method 300 advances to block 324, in which the NIC 120 sends the network packet and any one or more associated classification filters to the applicable host (e.g., a processor core, a VM, a hypervisor, etc.).

It should be appreciated that, in some embodiments, under conditions in which none of the criteria of any classification filters was met, the NIC 120 may be configured to notify the applicable host such that a new classification filter can be created and configured based on packet classification identifying information of the received network packet. Additionally or alternatively, in some embodiments, under such conditions, the NIC 120 may be configured to automatically create and configure a new classification based on packet classification identifying information of the received network packet.

Figure 4:
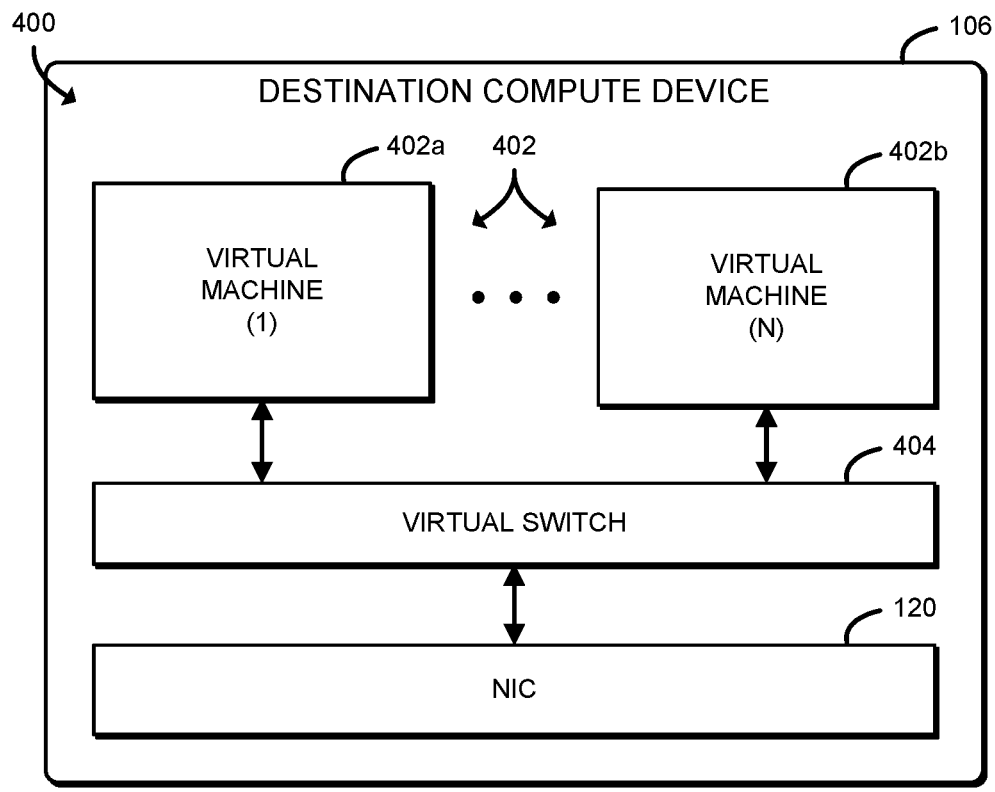
FIG. 4 is a simplified block diagram of at least one embodiment of another environment of the destination compute device of the system of FIG. 1.

Referring now to FIG. 4, in use, the destination compute device 106 establishes an illustrative environment 400 during operation. The illustrative environment 400 includes multiple virtual machines (VMs) 402, a virtual switch 404, and the NIC 120 of FIGS. 1 and 2. A VM 402 is a software program or operating system that not only exhibits the behavior of a separate computer, but is also capable of performing tasks such as running applications and programs like a separate computer. Commonly referred to as a "guest," VMs 402 are typically configured to run a dedicated operating system on shared physical hardware resources of the device (e.g., destination compute device 106) on which the VM 402 has been deployed, commonly referred to as a "host." Additionally, multiple VMs 402 can exist within a single host at one time.

The illustrative VMs 402 includes a first VM 402 designated as VM (1) 402a and a second VM 402 designated as VM (N) 402b (i.e., the "Nth" VM running on the destination compute device 106, wherein "N" is a positive integer and designates one or more additional VMs running on the destination compute device 106). The virtual switch 410 may be embodied as any type of virtualized switch capable of managing the internal data transfer of network traffic related information, such as by intelligently directing communications (e.g., to/from the NIC 120 and VMs 402, between the VMs 402, etc.) by inspecting packets before passing them on. However, unlike present techniques, as described herein the NIC 120 is configured to perform the classification filter identification on each received network packet such that packet inspection may be effectively bypassed, thereby saving compute that can otherwise be leveraged for other purposes.

In an illustrative example, the criteria of a classification filter are intended to identify Virtual Extensible Local Area Network (VxLAN) network traffic having a specific VxLAN Network Identifier (VNI) and inner destination media access code (MAC) address. Accordingly, the NIC 120 can receive a network packet associated with the VxLAN network traffic, compare the VNI and the inner destination MAC address of the received network packet with that of the aforementioned classification filter, and associate the identifier of that classification filter with the received network packet. In furtherance of the illustrative example the NIC 120 can transmit the received network packet and the associated classification filter identifier to the virtual switch 404 (e.g., via virtual ports (not shown) configured as a bridge) for forwarding to a particular one of the VMs 402. Upon receipt of the network packet and the associated classification filter identifier, the virtual switch 404 knows, based on the rules associated with associated classification filter identifier, to only copy the inner packet to the destination VM 402. In other words, unlike present technologies, the virtual switch 404 does not need to examine the VxLAN VNI, nor the inner packet information. It should be appreciated that while illustratively described herein as being embodied as a virtual switch 404, the switching/routing mechanism may be embodied as any other type of physical or virtual switching/routing device, such as a virtual function in a single root input/output virtualization (SR-IOV) embodiment, for example.

EXAMPLES

Illustrative examples of the technologies disclosed herein are provided below. An embodiment of the technologies may include any one or more, and any combination of, the examples described below.

Example 1 includes a network interface controller (NIC) for filtering network packets on ingress, the NIC comprising classification filter comparator circuitry to determine packet classification identifying information of a network packet received by the NIC, retrieve a plurality of classification filters, wherein each of the plurality of classification filters includes one or more criterion, and wherein each of the plurality of classification filters is associated with a classification filter identifier usable to identify rules for the determination of one or more operations that are to be performed on at least a portion of the received network packet, and compare the one or more criterion of a first classification filter to the determined packet classification identifying information to determine whether the determined packet classification identifying information meets the one or more criterion of the first classification filter; and classification filter identifier insertion circuitry to associate, in response to a determination that the comparison indicated that the determined packet classification identifying information meets the one or more criterion of the first classification filter, a classification filter identifier of the first classification filter with the received network packet.

Example 2 includes the subject matter of Example 1, and wherein the NIC further includes host interface management circuitry to send the received network packet and the classification filter identifier of the first classification filter to a processor of an apparatus associated with the NIC.

Example 3 includes the subject matter of any of Examples 1 and 2, and wherein to associate the classification filter identifier of the first classification filter with the received network packet comprises to insert the classification filter identifier of the first classification filter into a descriptor associated with the received network packet.

Example 4 includes the subject matter of any of Examples 1-3, and wherein to associate the classification filter identifier of the first classification filter with the received network packet comprises to insert the classification filter identifier at an offset in a payload of the received network packet, and wherein the classification filter is usable by an interpreting component to identify the rules and bypass inspection of the received network packet.

Example 5 includes the subject matter of any of Examples 1-4, and wherein to determine the packet classification identifying information comprises to determine the packet classification identifying information based on at least a portion of the data of the received network packet.

Example 6 includes the subject matter of any of Examples 1-5, and wherein to determine the packet classification identifying information comprises to determine the packet classification identifying information based on at least one characteristic of the received network packet.

Example 7 includes the subject matter of any of Examples 1-6, and wherein the at least one characteristic of the received network packet includes an encrypted state of the received network packet, a protocol associated with the received network packet, a source of the received network packet, and a destination of the received network packet.

Example 8 includes the subject matter of any of Examples 1-7, and wherein the classification filter comparator circuitry is further to compare one or more criterion of a second classification filter to the determined packet classification identifying information to determine whether the determined packet classification identifying information meets the one or more criterion of the second classification filter, and wherein the classification filter identifier insertion circuitry is further to associate, in response to a determination that the comparison indicated that the determined packet classification identifying information meets the one or more criterion of the second classification filter, a classification filter identifier of the second classification filter with the received network packet.

Example 9 includes the subject matter of any of Examples 1-8, and wherein the classification filter comparator circuitry is further to compare one or more criterion of a second classification filter to the determined packet classification identifying information to determine whether the determined packet classification identifying information meets the one or more criterion of the second classification filter, and determine, in response to a determination that the comparison indicated that the determined packet classification identifying information meets the one or more criterion of the second classification filter, a priority level of the first classification filter and a priority level of the second classification filter; and wherein the classification filter identifier insertion circuitry is further to associate, in response to a determination that the priority level of the second classification filter is higher than the priority level of the first classification filter, a classification filter identifier of the second classification filter with the received network packet, and wherein to associate the classification filter identifier of the second classification filter with the received network packet comprises to replace the classification filter identifier of the first classification filter with the classification filter identifier of the second classification filter.

Example 10 includes the subject matter of any of Examples 1-9, and wherein to associate the classification filter identifier of the first classification filter with the received network packet comprises to insert the classification filter identifier into a field in a header of the received network packet.

Example 11 includes one or more machine-readable storage media comprising a plurality of instructions stored thereon that, in response to being executed, cause a network interface controller (NIC) to determine packet classification identifying information of a network packet received by the NIC; retrieve a plurality of classification filters, wherein each of the plurality of classification filters includes one or more criterion, and wherein each of the plurality of classification filters is associated with a classification filter identifier usable to identify rules for the determination of one or more operations that are to be performed on at least a portion of the received network packet; compare the one or more criterion of a first classification filter to the determined packet classification identifying information to determine whether the determined packet classification identifying information meets the one or more criterion of the first classification filter; and associate, in response to a determination that the comparison indicated that the determined packet classification identifying information meets the one or more criterion of the first classification filter, a classification filter identifier of the first classification filter with the received network packet.

Example 12 includes the subject matter of Example 11, and wherein the plurality of instructions further cause the NIC to send the received network packet and the classification filter identifier of the first classification filter to a processor of an apparatus associated with the NIC.

Example 13 includes the subject matter of any of Examples 11 and 12, and wherein to associate the classification filter identifier of the first classification filter with the received network packet comprises to insert the classification filter identifier of the first classification filter into a descriptor associated with the received network packet.

Example 14 includes the subject matter of any of Examples 11-13, and wherein to associate the classification filter identifier of the first classification filter with the received network packet comprises to insert the classification filter identifier into at least one of a field in a header of the received network packet and at an offset in a payload of the received network packet, and wherein the classification filter is usable by an interpreting component to identify the rules and bypass inspection of the received network packet.

Example 15 includes the subject matter of any of Examples 11-14, and wherein to determine the packet classification identifying information comprises to determine the packet classification identifying information based on at least a portion of the data of the received network packet.

Example 16 includes the subject matter of any of Examples 11-15, and wherein to determine the packet classification identifying information comprises to determine the packet classification identifying information based on at least one characteristic of the received network packet.

Example 17 includes the subject matter of any of Examples 11-16, and wherein the at least one characteristic of the received network packet includes an encrypted state of the received network packet, a protocol associated with the received network packet, a source of the received network packet, and a destination of the received network packet.

Example 18 includes the subject matter of any of Examples 11-17, and wherein the plurality of instructions further cause the NIC to compare one or more criterion of a second classification filter to the determined packet classification identifying information to determine whether the determined packet classification identifying information meets the one or more criterion of the second classification filter; and associate, in response to a determination that the comparison indicated that the determined packet classification identifying information meets the one or more criterion of the second classification filter, a classification filter identifier of the second classification filter with the received network packet.

Example 19 includes the subject matter of any of Examples 11-18, and wherein the plurality of instructions further cause the NIC to compare one or more criterion of a second classification filter to the determined packet classification identifying information to determine whether the determined packet classification identifying information meets the one or more criterion of the second classification filter; determine, in response to a determination that the comparison indicated that the determined packet classification identifying information meets the one or more criterion of the second classification filter, a priority level of the first classification filter and a priority level of the second classification filter; and associate, in response to a determination that the priority level of the second classification filter is higher than the priority level of the first classification filter, a classification filter identifier of the second classification filter with the received network packet, wherein to associate the classification filter identifier of the second classification filter with the received network packet comprises to replace the classification filter identifier of the first classification filter with the classification filter identifier of the second classification filter.

Example 20 includes the subject matter of any of Examples 11-19, and wherein to associate the classification filter identifier of the first classification filter with the received network packet comprises to insert the classification filter identifier into at least one of a field in a header of the received network packet and at an offset in a payload of the received network packet, and wherein the classification filter is usable by an interpreting component to identify the rules and bypass inspection of the received network packet.

Example 21 includes a network interface controller (NIC) for filtering network packets on ingress, the compute device comprising means for determining packet classification identifying information of a network packet received by the NIC; means for retrieving a plurality of classification filters, wherein each of the plurality of classification filters includes one or more criterion, and wherein each of the plurality of classification filters is associated with a classification filter identifier usable to identify rules for the determination of one or more operations that are to be performed on at least a portion of the received network packet; means for comparing the one or more criterion of a first classification filter to the determined packet classification identifying information to determine whether the determined packet classification identifying information meets the one or more criterion of the first classification filter; and means for associating, in response to a determination that the comparison indicated that the determined packet classification identifying information meets the one or more criterion of the first classification filter, a classification filter identifier of the first classification filter with the received network packet.

Example 22 includes the subject matter of Example 21, and further including circuitry for sending the received network packet and the classification filter identifier of the first classification filter to a processor of an apparatus associated with the NIC.

Example 23 includes the subject matter of any of Examples 21 and 22, and wherein the means for associating the classification filter identifier of the first classification filter with the received network packet comprise means for inserting the classification filter identifier of the first classification filter into a descriptor associated with the received network packet.

Example 24 includes the subject matter of any of Examples 21-23, and further including means for comparing one or more criterion of a second classification filter to the determined packet classification identifying information to determine whether the determined packet classification identifying information meets the one or more criterion of the second classification filter; means for determining, in response to a determination that the comparison indicated that the determined packet classification identifying information meets the one or more criterion of the second classification filter, a priority level of the first classification filter and a priority level of the second classification filter; and means for associating, in response to a determination that the priority level of the second classification filter is higher than the priority level of the first classification filter, a classification filter identifier of the second classification filter with the received network packet, wherein to associate the classification filter identifier of the second classification filter with the received network packet comprises to replace the classification filter identifier of the first classification filter with the classification filter identifier of the second classification filter.

Example 25 includes the subject matter of any of Examples 21-24, and wherein the means for associating the classification filter identifier of the first classification filter with the received network packet comprise means for inserting the classification filter identifier into at least one of a field in a header of the received network packet and at an offset in a payload of the received network packet, and wherein the classification filter is usable by an interpreting component to identify the rules and bypass inspection of the received network packet.

The invention claimed is:

1. A network interface controller (NIC) for filtering network packets on ingress, the NIC comprising:
classification filter comparator circuitry to:
determine packet classification identifying information of a network packet received by the NIC,
retrieve a plurality of classification filters, wherein each of the plurality of classification filters includes one or more criterion, and wherein each of the plurality of classification filters is associated with a classification filter identifier usable to identify rules for the determination of one or more operations that are to be performed on at least a portion of the received network packet, and
compare the one or more criterion of a first classification filter to the determined packet classification identifying information to determine whether the determined packet classification identifying information meets the one or more criterion of the first classification filter; and
classification filter identifier insertion circuitry to associate, in response to a determination that the comparison indicated that the determined packet classification identifying information meets the one or more criterion of the first classification filter, a classification filter identifier of the first classification filter with the received network packet.

2. The NIC of claim 1, wherein the NIC further includes host interface management circuitry to send the received network packet and the classification filter identifier of the first classification filter to a processor of an apparatus associated with the NIC.

3. The NIC of claim 1, wherein to associate the classification filter identifier of the first classification filter with the received network packet comprises to insert the classification filter identifier of the first classification filter into a descriptor associated with the received network packet.

4. The NIC of claim 1, wherein to associate the classification filter identifier of the first classification filter with the received network packet comprises to insert the classification filter identifier at an offset in a payload of the received network packet, and wherein the classification filter is usable by an interpreting component to identify the rules and bypass inspection of the received network packet.

5. The NIC of claim 1, wherein to determine the packet classification identifying information comprises to determine the packet classification identifying information based on at least a portion of the data of the received network packet.

6. The NIC of claim 1, wherein to determine the packet classification identifying information comprises to determine the packet classification identifying information based on at least one characteristic of the received network packet.

7. The NIC of claim 6, wherein the at least one characteristic of the received network packet includes an encrypted state of the received network packet, a protocol associated with the received network packet, a source of the received network packet, and a destination of the received network packet.

8. The NIC of claim 1, wherein the classification filter comparator circuitry is further to compare one or more criterion of a second classification filter to the determined packet classification identifying information to determine whether the determined packet classification identifying information meets the one or more criterion of the second classification filter, and
wherein the classification filter identifier insertion circuitry is further to associate, in response to a determination that the comparison indicated that the determined packet classification identifying information meets the one or more criterion of the second classification filter, a classification filter identifier of the second classification filter with the received network packet.

9. The NIC of claim 1, wherein the classification filter comparator circuitry is further to:
compare one or more criterion of a second classification filter to the determined packet classification identifying information to determine whether the determined packet classification identifying information meets the one or more criterion of the second classification filter, and
determine, in response to a determination that the comparison indicated that the determined packet classification identifying information meets the one or more criterion of the second classification filter, a priority level of the first classification filter and a priority level of the second classification filter; and
wherein the classification filter identifier insertion circuitry is further to associate, in response to a determination that the priority level of the second classification filter is higher than the priority level of the first classification filter, a classification filter identifier of the second classification filter with the received network packet, and wherein to associate the classification filter identifier of the second classification filter with the received network packet comprises to replace the classification filter identifier of the first classification filter with the classification filter identifier of the second classification filter.

10. The NIC of claim 1, wherein to associate the classification filter identifier of the first classification filter with the received network packet comprises to insert the classification filter identifier into a field in a header of the received network packet.

11. One or more non-transitory, machine-readable storage media comprising a plurality of instructions stored thereon that, in response to being executed, cause a network interface controller (NIC) to:
determine packet classification identifying information of a network packet received by the NIC;
retrieve a plurality of classification filters, wherein each of the plurality of classification filters includes one or more criterion, and wherein each of the plurality of classification filters is associated with a classification filter identifier usable to identify rules for the determination of one or more operations that are to be performed on at least a portion of the received network packet;

compare the one or more criterion of a first classification filter to the determined packet classification identifying information to determine whether the determined packet classification identifying information meets the one or more criterion of the first classification filter; and associate, in response to a determination that the comparison indicated that the determined packet classification identifying information meets the one or more criterion of the first classification filter, a classification filter identifier of the first classification filter with the received network packet.

12. The one or more non-transitory, machine-readable storage media of claim 11, wherein the plurality of instructions further cause the NIC to send the received network packet and the classification filter identifier of the first classification filter to a processor of an apparatus associated with the NIC.

13. The one or more non-transitory, machine-readable storage media of claim 11, wherein to associate the classification filter identifier of the first classification filter with the received network packet comprises to insert the classification filter identifier of the first classification filter into a descriptor associated with the received network packet.

14. The one or more non-transitory, machine-readable storage media of claim 11, wherein to associate the classification filter identifier of the first classification filter with the received network packet comprises to insert the classification filter identifier into at least one of a field in a header of the received network packet and at an offset in a payload of the received network packet, and wherein the classification filter is usable by an interpreting component to identify the rules and bypass inspection of the received network packet.

15. The one or more non-transitory, machine-readable storage media of claim 11, wherein to determine the packet classification identifying information comprises to determine the packet classification identifying information based on at least a portion of the data of the received network packet.

16. The one or more non-transitory, machine-readable storage media of claim 11, wherein to determine the packet classification identifying information comprises to determine the packet classification identifying information based on at least one characteristic of the received network packet.

17. The one or more non-transitory, machine-readable storage media of claim 16, wherein the at least one characteristic of the received network packet includes an encrypted state of the received network packet, a protocol associated with the received network packet, a source of the received network packet, and a destination of the received network packet.

18. The one or more non-transitory, machine-readable storage media of claim 11, wherein the plurality of instructions further cause the NIC to:

compare one or more criterion of a second classification filter to the determined packet classification identifying information to determine whether the determined packet classification identifying information meets the one or more criterion of the second classification filter; and associate, in response to a determination that the comparison indicated that the determined packet classification identifying information meets the one or more criterion of the second classification filter, a classification filter identifier of the second classification filter with the received network packet.

19. The one or more non-transitory, machine-readable storage media of claim 11, wherein the plurality of instructions further cause the NIC to:

compare one or more criterion of a second classification filter to the determined packet classification identifying information to determine whether the determined packet classification identifying information meets the one or more criterion of the second classification filter;

determine, in response to a determination that the comparison indicated that the determined packet classification identifying information meets the one or more criterion of the second classification filter, a priority level of the first classification filter and a priority level of the second classification filter; and associate, in response to a determination that the priority level of the second classification filter is higher than the priority level of the first classification filter, a classification filter identifier of the second classification filter with the received network packet, wherein to associate the classification filter identifier of the second classification filter with the received network packet comprises to replace the classification filter identifier of the first classification filter with the classification filter identifier of the second classification filter.

20. The one or more non-transitory, machine-readable storage media of claim 11, wherein to associate the classification filter identifier of the first classification filter with the received network packet comprises to insert the classification filter identifier into at least one of a field in a header of the received network packet and at an offset in a payload of the received network packet, and wherein the classification filter is usable by an interpreting component to identify the rules and bypass inspection of the received network packet.

21. A network interface controller (NIC) for filtering network packets on ingress, the compute device comprising:

means for determining packet classification identifying information of a network packet received by the NIC;

means for retrieving a plurality of classification filters, wherein each of the plurality of classification filters includes one or more criterion, and wherein each of the plurality of classification filters is associated with a classification filter identifier usable to identify rules for the determination of one or more operations that are to be performed on at least a portion of the received network packet;

means for comparing the one or more criterion of a first classification filter to the determined packet classification identifying information to determine whether the determined packet classification identifying information meets the one or more criterion of the first classification filter; and means for associating, in response to a determination that the comparison indicated that the determined packet classification identifying information meets the one or more criterion of the first classification filter, a classification filter identifier of the first classification filter with the received network packet.

22. The NIC of claim 21, further comprising circuitry for sending the received network packet and the classification filter identifier of the first classification filter to a processor of an apparatus associated with the NIC.

23. The NIC of claim 21, wherein the means for associating the classification filter identifier of the first classification filter with the received network packet comprise means for inserting the classification filter identifier of the first classification filter into a descriptor associated with the received network packet.

24. The NIC of claim 21, further comprising:
means for comparing one or more criterion of a second classification filter to the determined packet classification identifying information to determine whether the determined packet classification identifying information meets the one or more criterion of the second classification filter;
means for determining, in response to a determination that the comparison indicated that the determined packet classification identifying information meets the one or more criterion of the second classification filter, a priority level of the first classification filter and a priority level of the second classification filter; and
means for associating, in response to a determination that the priority level of the second classification filter is higher than the priority level of the first classification filter, a classification filter identifier of the second classification filter with the received network packet, wherein to associate the classification filter identifier of the second classification filter with the received network packet comprises to replace the classification filter identifier of the first classification filter with the classification filter identifier of the second classification filter.

25. The NIC of claim 21, wherein the means for associating the classification filter identifier of the first classification filter with the received network packet comprise means for inserting the classification filter identifier into at least one of a field in a header of the received network packet and at an offset in a payload of the received network packet, and wherein the classification filter is usable by an interpreting component to identify the rules and bypass inspection of the received network packet.

* * * * *